(12) United States Patent
Wassvik et al.

(10) Patent No.: US 8,860,696 B2
(45) Date of Patent: Oct. 14, 2014

(54) INTEGRATED TOUCH-SENSING DISPLAY APPARATUS AND METHOD OF OPERATING THE SAME

(75) Inventors: Ola Wassvik, Höör (SE); Tomas Christiansson, Torna-Hällestad (SE)

(73) Assignee: Flatfrog Laboratories AB, Lund (SE)

( * ) Notice: Subject to any disclaimer, the term of this patent is extended or adjusted under 35 U.S.C. 154(b) by 420 days.

(21) Appl. No.: 12/998,611

(22) PCT Filed: Nov. 12, 2009

(86) PCT No.: PCT/SE2009/000492
§ 371 (c)(1),
(2), (4) Date: May 9, 2011

(87) PCT Pub. No.: WO2010/056177
PCT Pub. Date: May 20, 2010

(65) Prior Publication Data
US 2011/0216042 A1    Sep. 8, 2011

Related U.S. Application Data

(60) Provisional application No. 61/193,275, filed on Nov. 12, 2008.

(30) Foreign Application Priority Data

Nov. 12, 2008  (SE) ...................................... 0802383

(51) Int. Cl.
| | |
|---|---|
| *G09G 5/00* | (2006.01) |
| *G06F 3/042* | (2006.01) |
| *G06F 3/041* | (2006.01) |
| *G06K 11/06* | (2006.01) |
| *G08C 21/00* | (2006.01) |
| *G02F 1/1333* | (2006.01) |
| *G02B 6/42* | (2006.01) |

(52) U.S. Cl.
CPC ............ *G06F 3/042* (2013.01); *G02F 1/13338* (2013.01); *G02B 6/429* (2013.01); *G06F 3/0428* (2013.01); *G06F 3/0412* (2013.01); *G06F 2203/04109* (2013.01)
USPC ........ 345/176; 345/156; 345/175; 178/18.01; 178/18.09

(58) Field of Classification Search
USPC ..................... 345/156–184; 178/18.01, 18.09
See application file for complete search history.

(56) References Cited

U.S. PATENT DOCUMENTS

| | | | | |
|---|---|---|---|---|
| 5,736,686 | A  * | 4/1998 | Perret et al. ................ | 178/18.11 |
| 7,655,901 | B2 * | 2/2010 | Idzik et al. ............... | 250/227.22 |
| 7,924,272 | B2 * | 4/2011 | Boer et al. .................... | 345/175 |

(Continued)

FOREIGN PATENT DOCUMENTS

| | | |
|---|---|---|
| EP | 1288848 | 3/2003 |
| WO | WO 2005/114369 | 12/2005 |

(Continued)

OTHER PUBLICATIONS

European Search Report dated Mar. 29, 2012 issued in European Application No. 09826361.9.

*Primary Examiner* — Ilana Spar
(74) *Attorney, Agent, or Firm* — Harness, Dickey & Pierce, P.L.C.

(57) ABSTRACT

An integrated touch-sensing display is operated to detect the location of one or more objects on a touch surface. The integrated touch-sensing display defines a display area. A light guide (14) is arranged over the display area to define the touch surface (16). The light guide (14) is illuminated internally such that an object (20) contacting the touch surface (16) causes part of the illuminating light to be scattered towards the display area. An array of light sensors (6) is integrated within the display area to detect the scattered light. Based on output signals from the light sensors (6), a processing element obtains image data that represents the light that impinges on the display area excluding ambient light, and determines the location of the object (20) on the touch surface (16). Ambient light may be suppressed by a spectral passband filter in front of each light sensor (6), and/or by electronic filtering of the output signals from the sensors (6). The light guide (14) may be illuminated by invisible light, and may be arranged to cause an illuminating beam to be internally reflected at a peripheral edge surface of the light guide (14), so as to increase the intensity of illuminating light inside the light guide (14).

39 Claims, 6 Drawing Sheets

(56) References Cited

U.S. PATENT DOCUMENTS

| | | |
|---|---|---|
| 2003/0016450 A1 | 1/2003 | Bluemel et al. |
| 2004/0201579 A1* | 10/2004 | Graham ................. 345/175 |
| 2007/0125937 A1 | 6/2007 | Eliasson et al. |
| 2007/0296688 A1 | 12/2007 | Nakamura et al. |
| 2008/0029691 A1 | 2/2008 | Han |
| 2008/0074401 A1 | 3/2008 | Chung et al. |
| 2008/0122803 A1 | 5/2008 | Izadi et al. |
| 2008/0192025 A1* | 8/2008 | Jaeger et al. ............ 345/173 |
| 2008/0266266 A1 | 10/2008 | Kent et al. |
| 2009/0002340 A1* | 1/2009 | Van Genechten ......... 345/175 |
| 2010/0134435 A1* | 6/2010 | Kimura et al. ........... 345/173 |
| 2010/0302240 A1* | 12/2010 | Lettvin ................... 345/419 |
| 2012/0182266 A1* | 7/2012 | Han ....................... 345/175 |

FOREIGN PATENT DOCUMENTS

| | | |
|---|---|---|
| WO | WO 2006/134552 | 12/2006 |
| WO | WO 2007/058924 | 5/2007 |
| WO | WO 2007058924 A2 * | 5/2007 |
| WO | WO 2007/112742 | 10/2007 |

* cited by examiner

INTEGRATED TOUCH-SENSING DISPLAY APPARATUS AND METHOD OF OPERATING THE SAME

CROSS-REFERENCE TO RELATED APPLICATIONS

The present application claims the benefit of Swedish patent application No. 0802383-0, filed on Nov. 12, 2008, and U.S. provisional application No. 61/193,275, filed on Nov. 12, 2008, both of which are incorporated herein by reference.

TECHNICAL FIELD

The present invention relates to techniques for detecting the location of one or more of objects on a touch surface of a display apparatus.

BACKGROUND

To an increasing extent, touch-sensitive panels are being used for providing input data to computers, electronic measurement and test equipment, gaming devices, etc.

In one category of touch-sensitive panels, denoted "integrated touch-sensing displays" in the following, an array of light-sensitive elements is integrated in a display screen or panel, whereby the location of an object touching the display screen is detected based on output signals from the individual light-sensitive elements. Integrated touch-sensing displays are generally designed to have a form factor similar to ordinary displays, and therefore the array of light-sensitive elements is arranged in proximity of the array of image-generating elements (also denoted "pixel-defining elements" or "picture elements" in the following) in the depth direction of the display (i.e. perpendicular to the front surface of the display). Generally, the spacing between the arrays of light-sensitive elements and picture elements in the depth direction is less than about 15 cm, and often the light-sensitive elements and the picture elements are interleaved on a common substrate or at least in a common geometric plane within the display.

WO2007/058924 discloses such an integrated touch-sensing LCD (Liquid Crystal Display), in which a liquid crystal material is arranged between a front electrode layer and a rear electrode layer. By changing the potential applied to pixel-defining thin-film resistors (TFTs) on the rear electrode layer, the liquid crystal material is modified locally such that light from a backlight behind the rear electrode is selectively transmitted to a front surface of the display. The rear electrode layer also includes an array of light-sensing TFTs, which are designed to detect ambient light impinging on the front surface of the display. A processor determines the position of an object touching the front surface, by identifying light-sensing TFTs that have been inhibited from sensing ambient light. It is also suggested to supplement this shadow detection by a detection of visible light diffused from a light guide arranged on top of the liquid crystal material. A light source is controlled to inject visible light in the light guide to propagate therein by total internal reflection. When the object touches the light guide, the internally reflected light will be diffused towards the light-sensitive elements. The position of the object may then be determined from a combination of transmitted ambient light, light diffused from the waveguide and light transmitted from the backlight and reflected on the object.

Another integrated touch-sensing LCD is known from US2008/0074401, in which infrared light-sensing TFTs are included among pixel-defining TFTs on a lower substrate. A backlight is provided behind the lower substrate to produce visible and infrared light. A transparent window is aligned with each light-sensing TFT. An object touching the display will locally reflect the infrared light from the backlight back through one or more windows onto the light-sensing TFTs. Touch points are determined based on the output signals of the light-sensing TFTs.

In US2007/0296688, photosensors are disposed in a liquid crystal panel, and a backlight is disposed on a back side of the panel. The panel is controlled to operate in different detection modes based on the amount of ambient light. When the illuminance of ambient light is high, touching objects are identified as shadows in the ambient light reaching the photosensors. When the illuminance of ambient light is low, the backlight is controlled to emit invisible light and touching objects are identified based on reflected light reaching the photosensors.

The integrated touch-sensing displays of the prior art suffer from at least one of a number of different limitations. Such limitations include sensitivity to variations in ambient light, difficulty to distinguish between non-touching and touching objects, insufficient signal-to-noise ratio (SNR), reduced image quality (e.g. contrast, brightness, spatial resolution) compared to an ordinary display (i.e. without touch-sensitivity), complex determination of positions for touching objects, complex device control, and need for usage restrictions.

Similar limitations may be equally relevant to integrated touch-sensing displays that are based on other display technologies, such as plasma displays and OLED (Organic Light Emitting Diode) displays.

The prior art also comprises US2008/0029691 which discloses a touch surface formed by a waveguide that receives light that undergoes total internal reflection. A separate camera is arranged behind the waveguide to capture images of the waveguide surface. Touches on the front surface of the waveguide are detected by the camera detecting light that escapes the waveguide due to frustration of the total internal reflection. This touch-sensing apparatus has quite a different form factor than the above-described integrated displays, since the camera needs to be arranged with significant spacing from the waveguide in order to capture the images of the waveguide surface.

SUMMARY

It is an object of the invention to at least partly overcome one or more of the above-identified limitations of the prior art.

This and other objects, which will appear from the description below, are at least partly achieved by means of an integrated touch-sensing display apparatus, a method of operating such an apparatus and a computer-readable medium according to the independent claims, embodiments thereof being defined by the dependent claims.

Still other objectives, features, inventive aspects and advantages of the present invention will appear from the following detailed description, from the attached claims as well as from the drawings.

BRIEF DESCRIPTION OF THE DRAWINGS

Embodiments of the invention will now be described in more detail with reference to the accompanying schematic drawings.

DETAILED DESCRIPTION OF EXAMPLE EMBODIMENTS

Figure 1A:
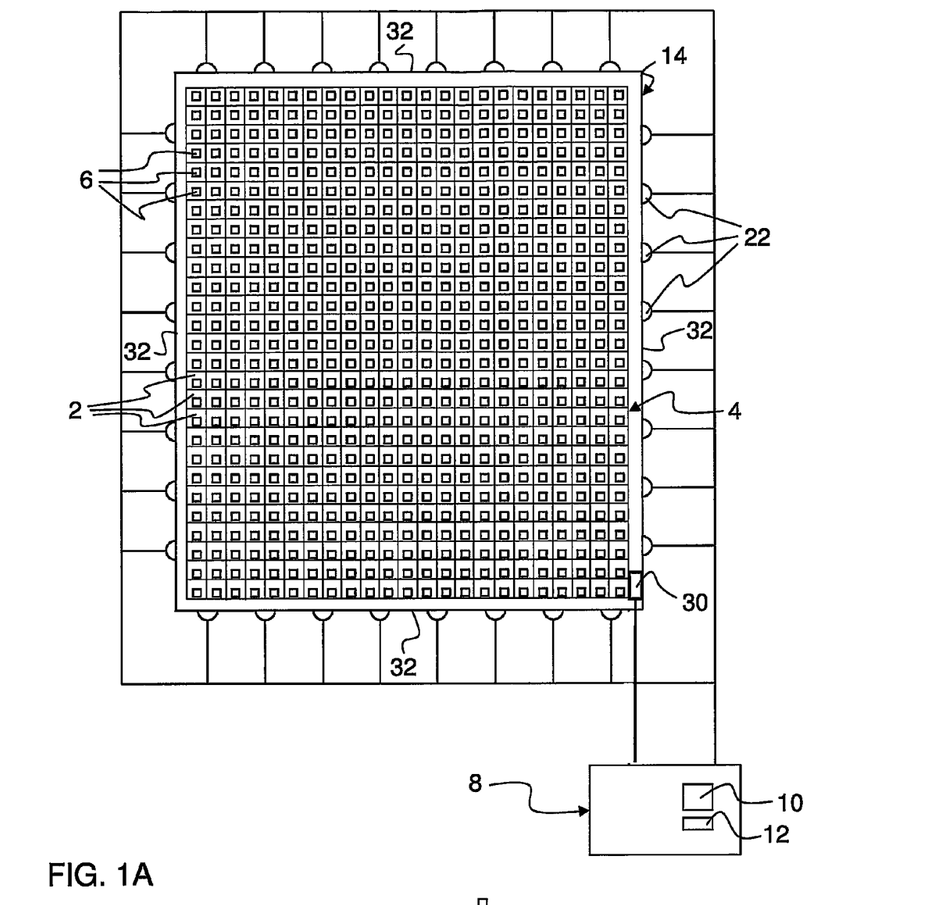
FIG. 1A is a top plan view of a touch-sensing display apparatus according to an exemplary embodiment.
Figure 1B:
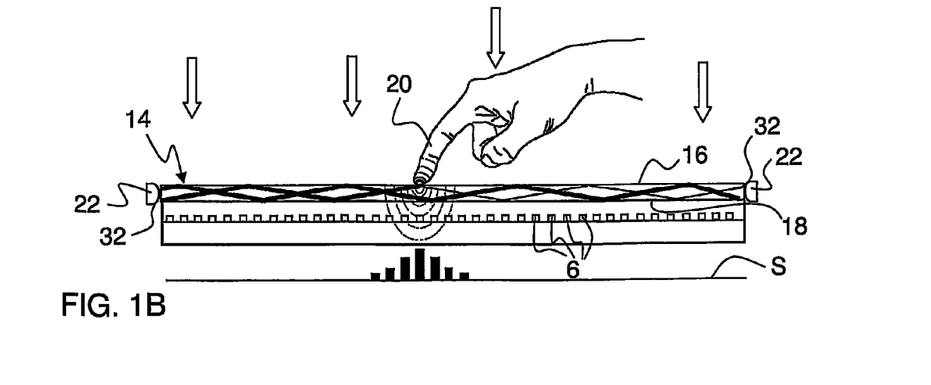
FIG. 1B is a side view of the display apparatus in FIG. 1A, which also shows a touching object and a resulting sensor signal pattern.

The present invention relates to techniques for detecting the location of one or more objects on a surface of an integrated touch-sensing display apparatus. The description starts out by describing general features in relation to an example embodiment of an integrated touch-sensing display apparatus. Then, different inventive aspects of the touch-sensing display apparatus, and embodiments thereof, are described. The description is concluded by a data processing example. Throughout the description, the same reference numerals are used to identify corresponding elements.
General FIGS. 1A and 1B are plan and side views, respectively, of an embodiment of a touch-sensing display apparatus. The apparatus includes an array of picture elements or pixels 2 (only shown in FIG. 1A) that are controllable to generate an image within a display area 4. Any known display technology for generating monochrome, greyscale or color images can implement these picture elements, e.g. LCD technology, plasma cell technology, or OLED technology. The pixels 2 are electrically connected to a controller (not shown) that controls the generation of images in the display area 4.

The display apparatus further includes an array of light-sensing elements or light sensors 6 arranged ("integrated") within the display area 4. In the example of FIG. 1A, each pixel 2 is associated with a sensor 6. In an alternative configuration (not shown), there is only one sensor for each N number of pixels, where the number N is a selected design parameter. The density of pixels 2 and/or sensors 6 may differ across the display area. The sensors 6 may be implemented by any suitable photosensor technology, e.g. charge coupled devices, CMOS devices, photodiodes, photoresistors, bipolar phototransistors, and photosensitive field-effect transistors including thin-film transistors.

A processing arrangement 8 is connected to receive the output signals of the sensors 6. The processing arrangement 8 may be implemented by any suitable processing hardware, optionally in combination with controlling software. For example, as shown, the processing arrangement 8 may include a central processing unit 10 and a memory 12, e.g. embodied as a general- or special-purpose computer or a microprocessor. The controlling software may be provided to the processing arrangement 8 on a computer-readable medium comprising program instructions which, when executed by the processing arrangement, causes the processing arrangement to perform specific operation control functions and data processing functions, as will be further described below.

The display apparatus further includes a front panel 14 which is arranged on top of the display area 4. The front panel 14, which may be either planar or curved, is illuminated internally by allowing radiation to propagate inside the panel by internal reflections. To this end, a radiation propagation channel is provided between two boundary surfaces 16, 18 of the panel, wherein the outer boundary surface ("touch surface") 16 allows the propagating radiation to interact with a touching object 20, which may be a finger, a stylus, a pointer, etc. In this interaction, part of the radiation may be scattered by the object 20, part of the radiation may be absorbed by the object 20, and part of the radiation may continue to propagate unaffected. The scattered radiation results in a local increase of detected radiation within the array of sensors 6, as indicated by the signal pattern S below the display apparatus in FIG. 1B.

Typically, the panel 14 is made of solid material, in one or more layers, and radiation propagates in the panel by total internal reflection (TIR). The above-mentioned process of interaction between the touching object 20 and the propagating radiation may involve so-called frustrated total internal reflection (FTIR), in which energy is dissipated into the object 20 from an evanescent wave formed by the propagating radiation, provided that the object 20 has a higher refractive index than the material surrounding the panel surface material and is placed within less than several wavelengths distance from the surface 16. Generally, the panel 14 may be made of any material that transmits a sufficient amount of radiation in the relevant wavelength range to permit a sensible transmission of energy. Such material includes glass, poly(methyl methacrylate) (PMMA) and polycarbonates (PC).

In the example of FIG. 1, the illuminating radiation (also denoted TIR radiation in the following) inside the panel 14 is provided by a plurality of light sources or emitters 22, which are distributed around the periphery of the panel 14. The emitters 22 may be connected to the processing arrangement 8 (as shown), or to a dedicated controller, for operation control. The emitters 22 may be of any suitable type, such as light-emitting diodes (LEDs), lasers, or lamps, or a combination thereof. It should be realized that the emitters 22 may be supplemented by further optical components, such as lenses, apertures, filters, reflectors, etc.

As indicated by block arrows in FIG. 1B, the front surface 16 of the display apparatus will also receive ambient light, i.e. light emanating from the surroundings of the display apparatus. Such ambient light may contain daylight and/or light from artificial light sources.

Thus, the present invention, in its different inventive aspects to be presented below, generally relates to a touch-sensing display apparatus, comprising: an array of picture elements 2 that defines a display area 4; an array of light-sensing elements 6 arranged within the display area 4; a light guide 14 located in front of the display area 4 to define a touch surface 16; a light source arrangement 22 for providing illuminating light inside the light guide 14, such that an object 20 contacting the touch surface 16 causes part of the illuminating light to be scattered towards the display area 4; and a processing element 8 configured to obtain, based on output signals from the light-sensing elements 6, image data that represents the light that impinges on the display area 4, and to determine, based on the image data, the location of the object 20 on the touch surface 16.

The present invention, in its different inventive aspects to be presented below, also generally relates to a method of operating a touch-sensing display apparatus, which apparatus comprises an array of pixel elements 2 that defines a display area 4; an array of light-sensing elements 6 integrated to sense light within the display area 4; a light guide 14 located in front of the display area 4 to define a touch surface 16; and a light source arrangement 22, said method comprising: controlling said at least one light source arrangement 22 to provide illuminating light inside the light guide 14, such that an object 20 contacting the touch surface 16 causes part of the illuminating light to be scattered towards the display area 4; obtaining, based on output signals from the light-sensing elements 6, image data that represents the light that impinges on the display area 4, and determining, based on the image data, the location of the object 20 on the touch surface 16.

First Inventive Aspect

According to a first inventive aspect of the present invention, the location of object(s) 20 touching the front surface of the display apparatus, i.e. the outer surface 16 of the panel 14, is determined based on image data that represents the light that impinges on the display area 4 excluding ambient light. Thus, the identification of touching objects 20 is not based on any signal pattern on the array of sensors 6 caused by ambient light, but is exclusively based on the signal pattern caused by the TIR radiation scattered from the front panel 14 by the touching object 20. This does not exclude the possibility that ambient light indeed generates a signal pattern of the array of sensors 6, rather it is intended to indicate that such a signal pattern is not useful for the identification of touching objects. Thus, the image data may comprise signal components originating from ambient light, but these signal components are unwanted since they decrease the touch sensitivity of the apparatus. Therefore, the display apparatus may comprise filter means for suppressing the ambient light in the image data. Suitably, the signal level resulting from ambient light in the image data is thereby suppressed to less than 10% of the signal level of any local maximum caused by scattered TIR radiation from a touching object, and preferably less than 5%, and most preferably less than 1%.

One advantage of the first inventive aspect is that it inherently discriminates between touching and non-touching objects, since only an object 20 that touches the front surface 16 of the panel 14 will cause scattering of the TIR radiation and thus produce a local maximum in the image data, whereas essentially no TIR radiation will be scattered on non-touching objects.

Another advantage is that the first inventive aspect, especially in combination with suppression of ambient light, enables use of simple algorithms for identifying the location of the touching object 20 based on the image data, since there is no need to account for shadows caused by the object 20.

The suppression of ambient light in the image data may result in an improved robustness of the location detection to variations in the ambient light, both spatially across the display area 4, and temporally.

Suppressing the ambient light may also serve to improve the signal-to-noise ratio (SNR).

Figure 2:
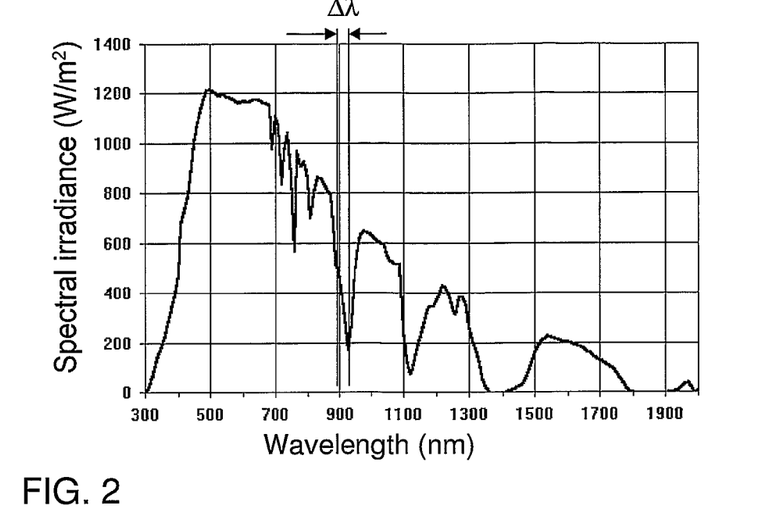
FIG. 2 is an example of spectral irradiance as a function of wavelength for daylight.

In one embodiment, the means for suppressing ambient light in the image data includes a spectral passband filter which is located in front of the sensors. The spectral filter is matched to transmit a major portion of the TIR radiation, and to block a major portion of the ambient light. FIG. 2 is a graph showing a typical terrestrial spectrum of sunlight, which could be representative of outdoor ambient light. The location and width of the passband $\Delta\lambda$ of the filter may be selected to achieve an adequate suppression of ambient light in relation to TIR radiation. In one embodiment, both the TIR radiation and the passband are confined to a narrow passband $\Delta\lambda$ of less than about 10 nm. In certain embodiments, the passband can be much smaller, e.g. 5, 1 or even 0.1 nm. If the TIR radiation is generated by a laser, the passband of the filter can be of the same magnitude as the line width of the laser, which often is 0.01 nm or less.

The provision of a spectral filter that blocks a major part of the ambient light will also serve to reduce the risk that the sensors are saturated at high ambient levels, such as in direct sunlight.

Figure 3:
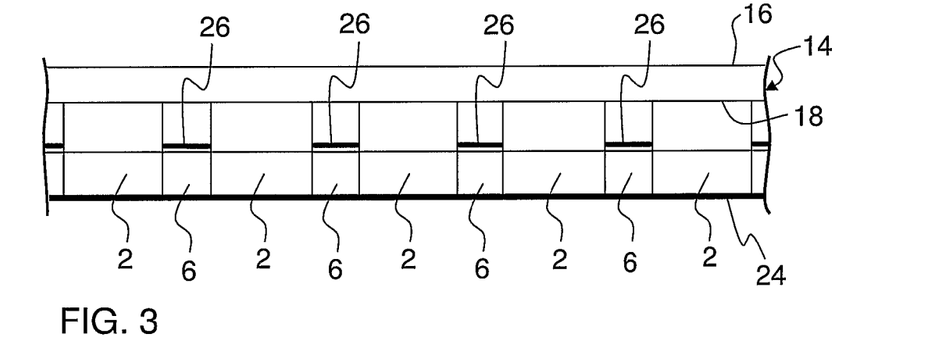
FIG. 3 is a side view of an embodiment for spectral filtering of ambient light.

FIG. 3 is a side view of part of a substrate 24 with interleaved pixel-defining structures 2 (typically at least an electrode) and sensors 6, with each sensor 6 being provided with an overlying spectral filter 26. In the illustrated embodiment, the filter 26 is applied to the top surface of each sensor 6. Alternatively (not shown), one large filter may be placed between the panel 14 and the pixel-defining structures 2, with openings in the filter 26 being aligned with the pixel-defining structures 2. Further alternative placements of the spectral filter will be described later on.

In another embodiment, the presence of ambient light in the image data is suppressed by electronic filtering of the output signals from the sensors 6. One advantage of suppressing ambient light by electronic filtering is that it does not affect the image quality of the displayed images. The electronic filtering is based on time-resolved detection of light during an exposure time by at least part of the sensors 6 in the array of sensors.

In one implementation, the electronic filtering is based on lock-in detection. As used herein, "lock-in detection" denotes any signal processing technique in which a signal component is extracted from a measurement signal by non-linear mixing of the measurement signal with a known modulation function.

The modulation function is used to modulate the TIR radiation with a known modulation frequency $\omega$. To this end, the emitter(s) 22 are controlled to generate TIR radiation modulated by the chosen modulation frequency $\omega$. The modulation frequency is preferably chosen such that the exposure time includes several periods (typically at least 10) of the modulation frequency. If we assume that the amplitude of the TIR radiation is given by, e.g., $E=E_0 \cdot \cos(\omega \cdot t)$, and that the emitters 22 are completely turned on when $\cos(\omega \cdot t)=1$ and that they are turned off when $\cos(\omega \cdot t)=-1$, the amplitude of the scattered TIR radiation will fluctuate with the same frequency. The measured irradiance at the sensors 6 will thus be (with an added phase $\phi$, and possibly a DC offset) converted to an electronic signal $I=I_0 \cdot \cos(\omega t + \phi)$. The added phase y may arise in the detection electronics or as a delay in the emitter electronics. Light from other sources, i.e. noise, will yield the irradiance $I_n$ on the sensor 6:

$$I_n = \Sigma I_f \cdot \cos(\omega_f t + \phi_f),$$

where the sum is computed over all frequency components in the noise, each frequency component being given by an irradiance $I_f$, a frequency $\omega_f$ and a phase $\phi_f$. We now want to extract only the relevant information, i.e. the intensity of the scattered TIR radiation. This may be achieved by non-linear mixing of the detected irradiance with a reference signal representing the modulation function of the emitter 22.

In a first example of lock-in detection using non-linear mixing, the detected irradiance and the modulation function are multiplied, whereupon the intensity of the scattered TIR radiation is determined from the resulting product using phase-sensitive detection.

The aforesaid mixing results in a signal D:

$$D \propto E_0 \cdot \cos(\omega \cdot t) \cdot (I_0 \cdot \cos(\omega \cdot t + \phi) + \Sigma I_j \cdot \cos(\omega_j \cdot t + \phi_j))$$

By taking advantage of that cosine functions are orthogonal if they have different frequency, it is possible to retrieve the intensity of the scattered TIR radiation. The orthogonality means that $$\frac{1}{T}\int_{t-T}^{t}\cos(\omega_d \cdot t + \varphi_d) \cdot \cos(\omega \cdot t + \varphi) d\tau = \begin{cases} 1/2 & \text{if } \omega_d = \omega \text{ and } \varphi_d = \varphi \\ 0 & \text{if } \omega_d \neq \omega \end{cases}$$

If there is a phase difference between the two cosine functions, the integral will be somewhere between 0 and ½. By integrating the signal D over a time that is significantly longer than the modulation period, the resulting signal will be proportional to the product $E_0 \cdot I_0$. By adjusting the relative phase of the signals E and I, it is possible to optimize the resulting signal. Since the modulation amplitude $E_0$ is known, the resulting signal can be converted into the intensity of the scattered TIR radiation. It is also possible to operate a low-pass-filter on the signal D to remove more of the noise sources (they have different frequency than the modulating frequency). For one skilled in the art this is easy to achieve.

A second example of lock-in detection using non-linear mixing is based on heterodyne detection, in which the detected irradiance and the modulation function are added and the resulting sum is squared. The resulting output contains high frequency, intermediate frequency and constant components. The amplitude of the intermediate frequency component is proportional to the amplitude of the scattered TIR radiation and may be isolated by adequate filtering.

In another implementation, the TIR radiation is also modulated with a known modulation frequency $\omega$, while the electronic filtering involves passing the output signals from the sensors 6 through a dedicated bandpass filter. The cut off frequencies $\omega_L$, $\omega_H$ of the bandpass filter is tailored to remove all frequency components from the output signal that are not close to the modulation frequency $\omega$, i.e. the bandpass filter blocks every frequency but the frequencies between $\omega_L=\omega-\Delta\omega/2$ and $\omega_H=\omega+\Delta\omega/2$. The signal that passes the bandpass filter will represent the scattered TIR radiation, the intensity of which may be given by the signal amplitude.

The different implementations of electronic filtering mentioned above can be effected by digital signal processing in the processing arrangement 8, using software and/or hardware components. However, for reasons of processing speed it may be preferable to implement the electronic filtering by analog electronics.

Figure 4:
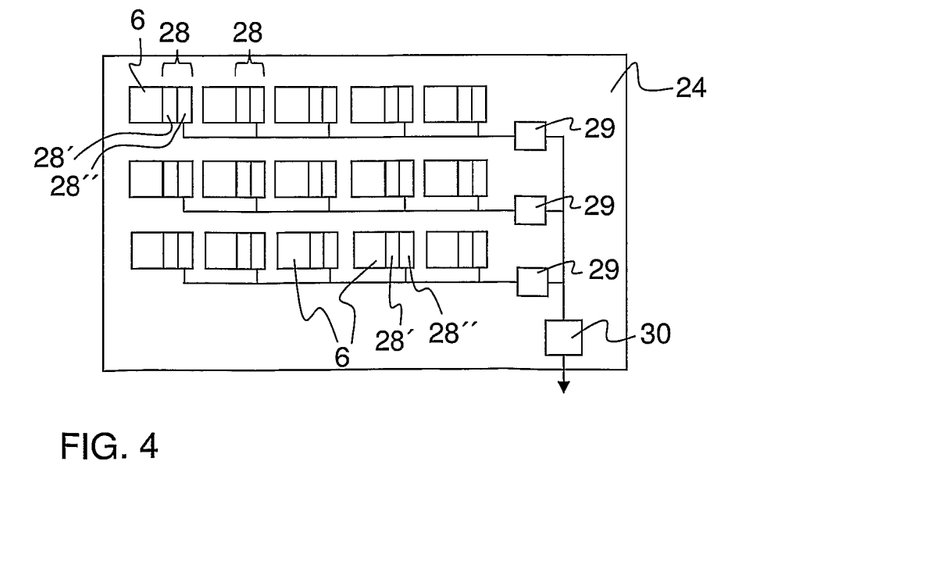
FIG. 4 is a top plan view of an embodiment for electronic filtering of ambient light.

In one configuration example, shown in FIG. 4, a dedicated filtering hardware block 28 is provided close to the individual sensors 6, typically on the same substrate or chip 24 as the sensors 6. Suitably, the analog output signals of the hardware blocks 28 are conveyed, optionally via one or more multiplexing units 29, to one or more A/D converters 30 that convert the analog signals to digital signal values suitable for digital processing in the processing arrangement 8 (FIG. 1A). Each digital signal value may represent the scattered TIR radiation detected by an individual sensor 6. The A/D converters 30 may or may not be integrated on the substrate 24. As indicated in FIG. 4, the filtering hardware block 28 may comprise sub-blocks (two shown: 28', 28") that implement dedicated sub-steps. In the example of phase-sensitive detection, the filtering hardware block 28 may include one sub-block 28' for non-linear mixing, one sub-block (not shown) for low-pass filtering the mixed signal and one sub-block 28" for integrating the filtered mixed signal during the exposure time. In the example of heterodyne detection, the filtering hardware block may include one sub-block 28' for non-linear mixing and one sub-block for amplitude detection 28". In the example of bandpass detection, the filtering hardware block may include one sub-block 28' for analog bandpass filtering, and one sub-block 28" for amplitude detection.

The configuration in FIG. 4 ensures efficient local pre-processing of the time-resolved output signals from the individual sensors, and serves to lower the demands on the A/D converter(s) 30 and the processing arrangement 8.

In yet another implementation of the electronic filtering, the emitters 22 are modulated to emit pulsed light, by switching the emitters 22 between on and off states. The radiation detected by the respective sensor 6 when the emitters 22 are in an off-state is used as a background signal level that may be subtracted from the radiation detected by the respective sensor 6 when the emitters are in an on-state. This kind of modulation requires that the sensors 6 are sampled at a frequency at least twice the position determination frequency (also called "update frequency", see below). This electronic filtering can be effected by digital signal processing in the processing arrangement 8, or by analog electronics, optionally on the same substrate/chip 24 as the array of sensors 6.

In all of the above implementations, the modulation frequency is suitably higher, and well spaced from, any frequencies of amplitude variations found in regular light sources, e.g. light bulbs (e.g. 50/100 Hz) or other electronic equipment. It may also be suitable that the modulation frequency is spaced from any frequencies of amplitude variations that may occur due to daylight interference, e.g. periodic blocking of sunlight that may occur when traveling by train or car, when objects move in the wind, by a rotating fan, etc. It is currently believed that a suitable modulation frequency is at least about 0.5 kHz, and preferably selected in the interval 1 kHz-1 GHz.

It should be understood that any form of electronic filtering of the output signal from the sensors 6 may be combined with the use of spectral filters 26 in front of the sensors 6. Such a combination may increase the suppression of ambient light and/or reduce the required performance of the respective suppression technique to achieve a certain degree of suppression.

It is also to be noted that electronic filtering as well as spectral filtering also may serve to suppress any light from the displayed image that is reflected back towards the display area by a touching or non-touching object. Suppressing this back-reflected light may reduce the risk of detection of false touches, e.g. caused by objects hovering above the outer surface 16.

Second Inventive Aspect

A second inventive aspect, which may but need not be combined with the first inventive aspect, is that the TIR radiation that illuminates the front panel 14 is invisible to the human eye, i.e. the TIR radiation is made up of at least one of ultraviolet radiation (UV, approx. 300 nm-400 nm), near-infrared radiation (NIR, approx. 700 nm-1400 nm), and infra-red radiation (IR, approx. 1400 nm-1 mm). It may be preferable to use NIR/IR radiation, since it is less harmful to human eyes than UV radiation.

The use of invisible radiation may reduce any negative impact on the displayed image, caused by potential leakage of TIR radiation from the front panel 14 in a direction away from the display area 4, i.e. towards a human viewer. It should be understood that although the front panel 14 is designed to contain the illuminating radiation by internal reflection, the inevitable presence of contaminants (e.g. dust, particles, fingerprints, liquid, etc) or scratches on the outer surface 16 of the panel 14 may cause leakage of TIR radiation. If the TIR radiation is invisible to the human eye, it will not impair the human perception of the displayed image.

Still further, it may be desirable to provide the outer surface 16 with an anti-glare structure/layer (not shown) to reduce glares from ambient light on the outer surface 16 of the panel 14. Such glares might otherwise impair the ability of an external observer to view the image generated in the display area 4. Furthermore, when the touching object 20 is a naked finger, the contact between the finger and the panel 14 normally leaves a fingerprint on the outer surface 16. On a perfectly flat surface, such fingerprints are clearly visible and usually unwanted. By adding an anti-glare structure/layer to the outer surface 16, the visibility of fingerprints is reduced. Furthermore, the friction between finger 20 and panel 14 decreases when an anti-glare is used, thereby improving the user experience. Anti-glares are specified in gloss units (GU), where lower GU values result in less glares. Generally, the provision of an anti-glare structure/layer results in significant leakage of radiation from the panel 14. It may thus be important for the TIR radiation to be invisible to the human eye.

Furthermore, the use of invisible radiation may allow for an increased SNR, since it may be possible to use an increased intensity of the illuminating radiation inside the panel 14 when using invisible radiation compared to visible radiation. An increased intensity will increase the risk of leakage, but the radiation is invisible and will not be registered by the human eye.

Still further, modern artificial lighting, such as fluorescent lamps and LED lamps, is generally designed to concentrate the emitted light to the visible spectrum. Thus, any influence from such ambient light may be significantly reduced by illuminating the panel 14 by NIR/IR radiation and detecting the scattered TIR radiation through a corresponding spectral passband filter 26. Similarly, at least some display technologies primarily radiate visible light from the display area 4. Thus, detecting scattered TIR radiation in NIR/IR may serve to effectively suppress any light from the display area 4 that is back-reflected by objects hovering above the outer surface 16.

Third Inventive Aspect

Figure 5A:
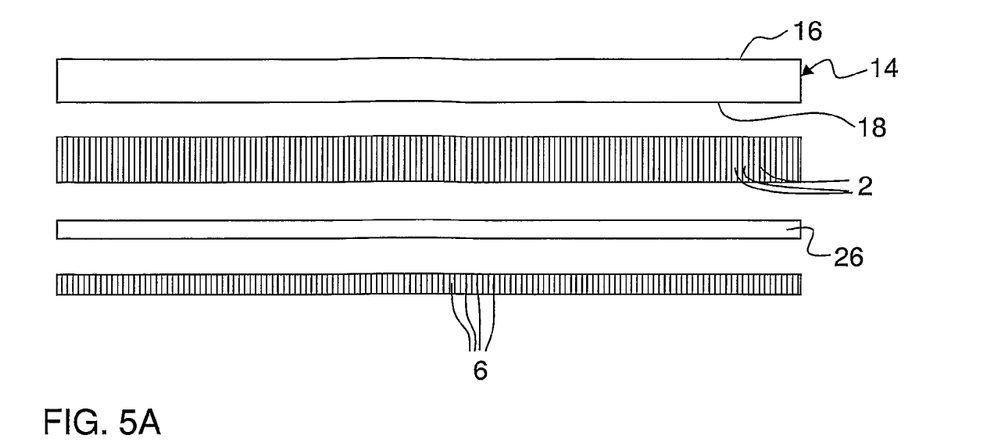
FIG. 5A is an exploded side view of an embodiment having an array of light sensors placed behind an array of pixels.

A third inventive aspect, which may but need not be combined with the first and/or second inventive aspects, is based on the recognition that the pixels 6 of most display technologies is or can be manufactured of material that is at least partially transparent to the TIR radiation. According to the third inventive aspect, as shown in FIG. 5A, the array of sensors 6 are thus arranged behind the array of pixels 2 as seen from the front surface 16. Compared to conventional touch-sensing displays, in which the sensors are integrated with the pixel-defining structures on a common substrate, the density of pixels 2 can be higher, since the provision of sensors 6 does not affect the density of pixels 2. A compact design of the array of pixels 2 can be obtained, e.g. if each sensor 6 is arranged to at least partially overlap a respective pixel 2.

Furthermore, as also shown in FIG. 5A, the aforesaid spectral filter 26 may be incorporated between the array of pixels 2 and the array of sensors 6, thereby eliminating any potential influence this filter 26 may have on the quality of the displayed image. Furthermore, instead of providing each sensor 6 with a dedicated spectral filter, one large spectral filter 26 may be used to cover all sensors, reducing the need for alignment between the spectral filter 26 and the sensors 6.

Figure 5B:
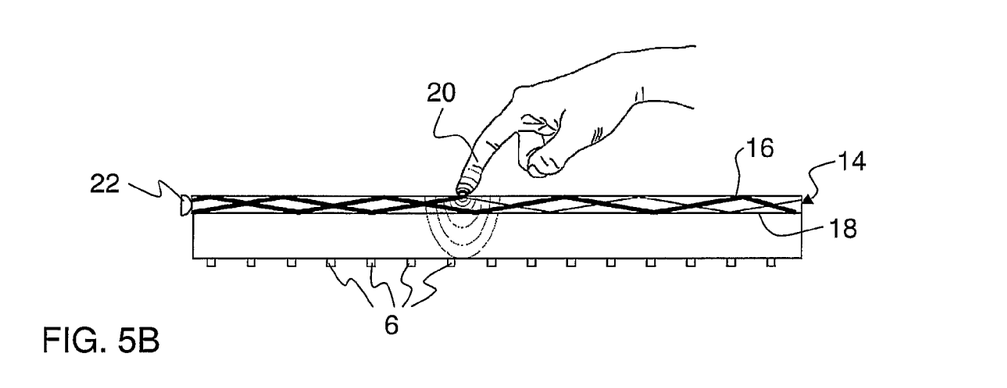
FIG. 5B is a side view of an embodiment with an array of light sensors placed on the back side of a display.

If the display apparatus is provided with a backlight which is transparent to the TIR radiation, the array of sensors 6 may be placed behind the backlight as well, as indicated in FIG. 5B.

Figure 6A:
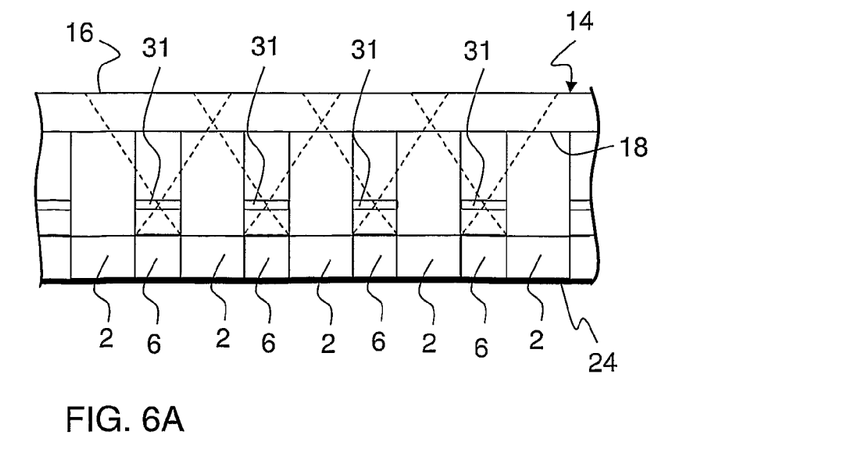
FIGS. 6A-6B are side views of embodiments with lenses in front of light sensors in a display apparatus.
Figure 6B:
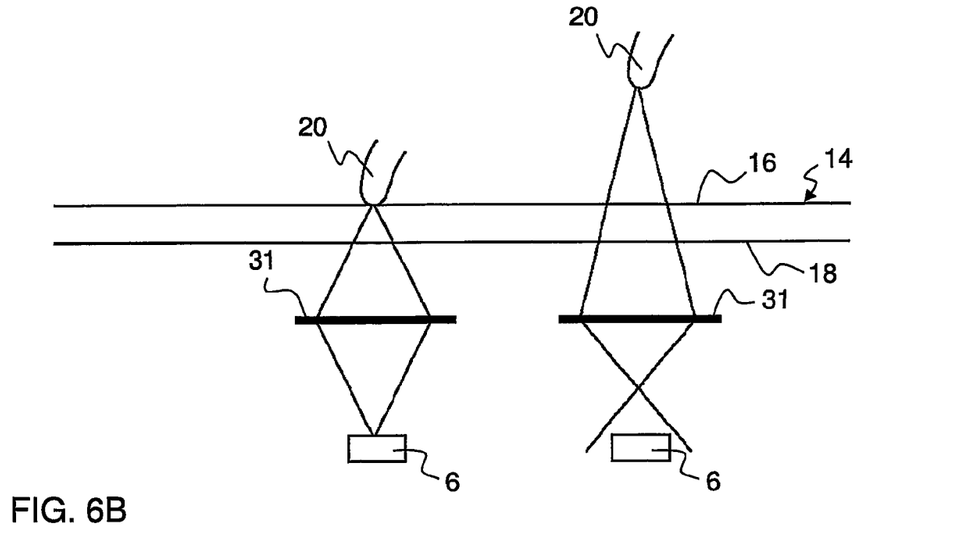

In all of the above inventive aspects, the sensors 6 may detect radiation in a wide angle, hence detecting noise radiation from other sources than the touching object 20. If there is scattering in the outer surface 16, other than the scattering caused by the touching object 20, TIR radiation may exit the panel 14 and be reflected or scattered, by objects near the surface 16, towards the sensors 6 where it may be detected and form a noise signal. As mentioned above, scattering in the outer surface 16 may be caused by contaminations, scratches or anti-glare structures on the outer surface 16. To reduce the noise from TIR radiation and display light scattered by objects hovering above the outer surface 16, as well as noise from ambient light, a lens 31 may be introduced in front of each sensor 6, as shown in FIGS. 6A-6B. The lens 31, e.g., a micro lens or a GRIN (gradient index) lens, may be arranged to reduce the sensor's 6 field of view (indicated by dotted lines in FIG. 6A) and/or cause the sensor 6 to be focused on the outer surface 16 (FIG. 6B). By reducing the field of view as shown in FIG. 6A), a sharper signal pattern may be produced by the array of sensors 6. FIG. 6B shows the effect of focusing, where radiation scattered on a touching object 20 (left) is projected onto a smaller area compared to radiation scattered on a hovering object 20 (right). Thus, by focusing the sensor 6 on the touch surface 16, radiation scattered by an object touching the touch surface 16 may be enhanced in relation to other radiation.

Returning to the embodiment of FIG. 1A, the panel is illuminated by emitters 22 arranged on or near the edges 32 of the panel 14. In one implementation, the emitters 22 are configured to emit the TIR radiation in wide angle beams so that each emitter 22 illuminates a large part of the panel 14. In other implementations, the emitters 22 are configured to emit the TIR radiation in narrow angle beams, or possibly collimated beams, whereby a larger number of emitters 22 may be required to sufficiently fill the panel 14 with TIR radiation.

The number of emitters 22 required to acquire the desired intensity of TIR radiation ("illumination intensity") in the panel 14 is determined by the radiating intensity of each emitter 22, the width of the beam from each emitter 22 as well as the size of the panel 14.

The emitters 22 may be placed equidistantly around the edges of the panel 14, or the distances between mutually adjacent emitters 22 may be randomized. The randomized distances may be used to reduce interference phenomena that may appear when a number of light sources inject radiation of the same wavelength into the panel.

Figure 7:
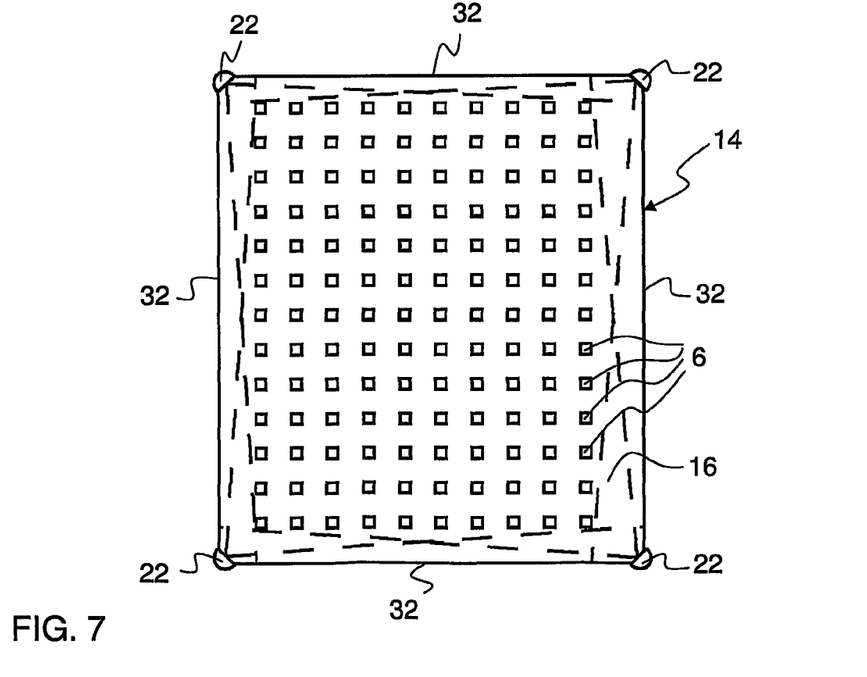
FIG. 7 is a top plan view of an embodiment with corner emitters.

FIG. 7 illustrates an alternative emitter configuration, in which emitters 22 are arranged near or at the corners of the panel 14. As indicated by dashed lines, these corner emitters 22 are positioned so as to emit radiation in wide angle beams, wherein the main directions of the beams are directed towards the centre of the panel 14 so as to spread the TIR radiation over as large a portion of the panel 14 as possible. The corner emitters 22 may be supplemented or replaced by emitters along the side edges of the panel, which emitters may also point towards the centre of the panel, so as to maximize the amount of emitted radiation that is used for touch detection.

In one embodiment, the emitted beams are prevented from propagating inside the panel without being reflected in at least the outer surface 16. Any part of the beam that propagates through the panel 14 without being reflected in the outer surface 16 does not contribute to the touch detection signal as this radiation cannot be frustrated by a touching object.

Figure 8:
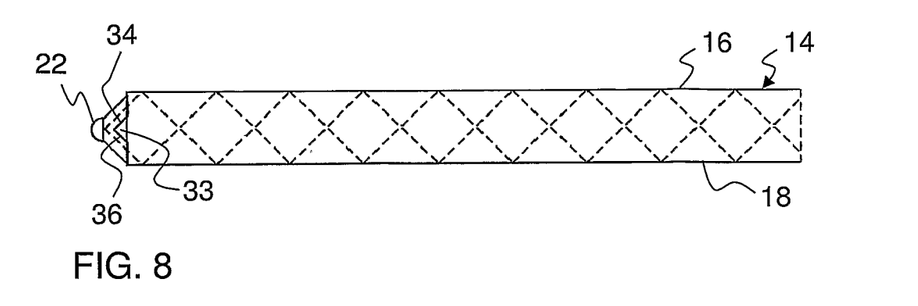
FIG. 8 is a side view of an embodiment with a light deflector between emitter and panel.

FIG. 8 is a side view of an embodiment, in which a V-shaped light deflector 33 is placed between the emitters 22 and the panel 14 to extend along one or more peripheral edges 32 of the panel 14 (only left edge shown). The light deflector 33 is configured to redirect, by way of angled mirror surfaces 34, 36, rays that are emitted essentially parallel to the opposite surfaces 16, 18 of the panel 14. Specifically, the rays are redirected towards either of the surfaces 16, 18, at an angle that ensures propagation by total internal reflection, suitably with at least one internal reflection in the touch surface 16.

Fourth Inventive Aspect

According to a fourth inventive aspect, which may or may not be combined with one or more of the first, second or third inventive aspects, the display apparatus is configured to cause the illuminating light to propagate by total internal reflection between the outer surface 16 and the opposite surface 18 of the panel 14 such that the propagating radiation is internally reflected at least once against the peripheral edge surface 32, which suitably is orthogonal to the parallel surfaces 16, 18 of the panel. Generally, this can be achieved by injecting at least one beam of light into the panel 14 such that the beam, in a plane parallel to the outer surface 16, hits the peripheral edge surface 32 at an angle which is non-parallel and non-orthogonal to the peripheral edge surface 32.

The fourth aspect will serve to increase the illumination intensity in the panel 14. The increased illumination intensity may be turned into an increased SNR, which may improve the robustness of the touch detection. Alternatively, the increased illumination intensity may be turned into a reduced power consumption of the display apparatus, by allowing the intensity of the emitted radiation to be decreased.

In one embodiment, angle between the beam and the normal of the peripheral edge surface 32 is larger than the critical angle, such that the beam will be subjected to total internal reflection.

In another embodiment, at least part of the peripheral surface edge is provided with mirrors or reflective material. Such an embodiment, which increases the available angles between the beam and the edge surface, enables use of a diverging beam without excessive leakage of radiation.

Figure 9:
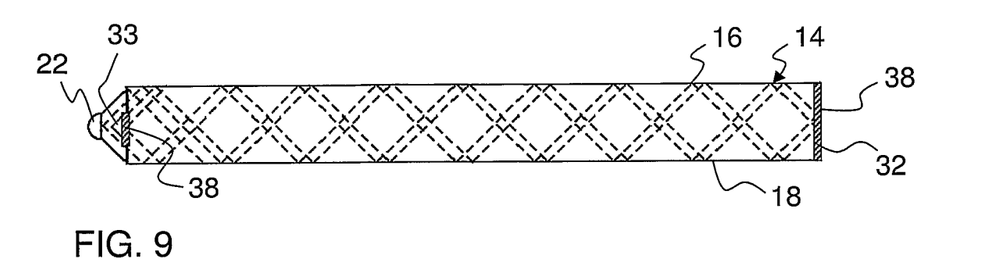
FIG. 9 is a side view of an embodiment having a panel with a reflective edge portion.

FIG. 9 is a side view of a panel 14 provided with emitters 22 and a light deflector 33 at one edge and a reflective material 38 at the opposite edge. To further increase the illumination intensity, a reflective material 38 is provided at the interface between the light deflector 33 and the edge. The dashed lines illustrate ray paths of the emitted radiation inside the panel 14.

The embodiment in FIG. 7 may likewise be provided with reflective surfaces along the edges 32 of the panel, e.g. by attaching mirrors or laminating a reflecting material to the edge portions not associated with an emitter 22.

Figure 10:
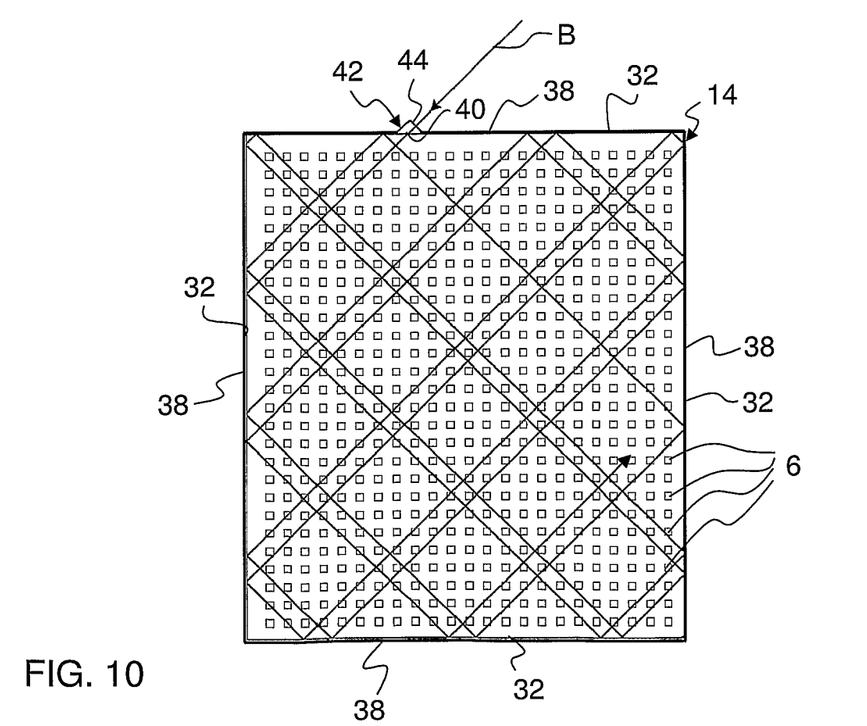
FIG. 10 is a top plan view of an embodiment having a panel with reflective edges and a light injection port.

FIG. 10 is a plan view of another embodiment in which the edges 32 of the panel 14 is provided with a reflective material 38. A beam B of radiation from an emitter (not shown) is injected into the panel 14 via an injection port 40 formed by an opening in the reflective material 38. The beam B is injected at an angle to the edges 32 of the panel 14, causing multiple internal reflections of the injected beam B against the edges 32 of the panel 14. By way of the multiple reflections, the injected beam B covers a larger area of the panel 14 than it would if it were to pass the panel 14 only once. Ideally, each beam B will stay inside the panel 14 until it is completely reduced by scattering/attenuation by one or more touching objects, by leakage, or by bulk absorption. This may be used to reduce the number of emitters around the edges, or may be used to increase the illumination intensity inside the panel. Alternatively, it may be used to decrease the intensity of the emitters. If used to increase the illumination intensity inside the panel 14, it may further allow for a decreased electronic amplification of the signals detected by the sensors 6, which may reduce the risk of sensors 6 being saturated by ambient light. It may be desired that the bulk absorption of the panel 14 is minimized so that the beam(s) B may propagate inside the panel 14 for longer times. At least for NIR/IR radiation, this may be achieved by using a panel made of PMMA, since PMMA has a lower absorption in this wavelength region than e.g. glass.

In the embodiment of FIG. 10, a wedge 42 is attached to the injection port 40 to couple the beam B into the panel 14. The index of refraction of the wedge 42 is suitably matched to that of the panel 14. In order to minimize reflection losses, the wedge 42 has a beam-receiving surface 44 which is essentially orthogonal to the main direction of the beam B.

The embodiment of FIG. 10 may be provided with any number of injection ports 40. The area of each injection port 40 is preferably small (typically <20%, preferably <10%, <5% or <2%) compared to the area of the associated edge 32, and the total area of the injection ports is preferably small (typically <20%, preferably <10%, <5% or <2%) compared to the overall edge surface of the panel 14, so that the injected beam(s) B is more likely to be reflected in the edges 32 of the panel 14 than to escape the panel 14 through an injection port 40. It may be advantageous to use one or more lasers or laser diodes as emitter(s), to provide collimated radiation of high intensity, and narrow spectral bandwidth.

In could be noted that the internal edge reflection(s) of the fourth inventive aspect will not interfere with the frequency modulation described above in relation to the first inventive aspect, since the radiation injected into the panel will be absorbed by the panel or leak out of the panel on a shorter time scale than the time scale of the amplitude modulation of the emitters.

Data Processing

In all of the above described inventive aspects, embodiments, configurations, arrangements, alternatives and variants, the processing arrangement 8 (FIG. 1A) may be configured to calculate the position of an object 20 touching the panel 14 based on the output signals of the sensors 6 during a sensing instance. A sensing instance is formed when all sensors within the array of sensors 6 have been read. The temporal resolution of the system is determined by the update frequency, which is the frequency of sensing instances. For example, for a system designed for recording of handwriting, it may be desirable to have an update frequency of at least 50-75 Hz, whereas other applications may require a lower or higher temporal resolution.

The touch-sensing display apparatus may be operated to determine the location of not only one object, but a plurality of objects touching the panel during a sensing instance. Only part of the illuminating radiation is absorbed/scattered by each touching object, while the remaining illuminating radiation continues to propagate inside the panel by internal reflection. Thus, if two touching objects happen to be placed after each other in the main direction of a beam, part of the beam will interact with both objects. Provided that the beam energy is sufficient, scattered radiation from both objects may be detected with radiation from that beam. To increase the ability for detection of multiple touching objects, it may be advantageous to illuminate the panel such that each area of the outer surface is illuminated by at least two beams. If a first beam is heavily attenuated by one or more touching objects, it is likely that another touching object in the path of the first beam will interact with a second beam of radiation to generate a sufficient amount of scattered radiation.

Figure 11:
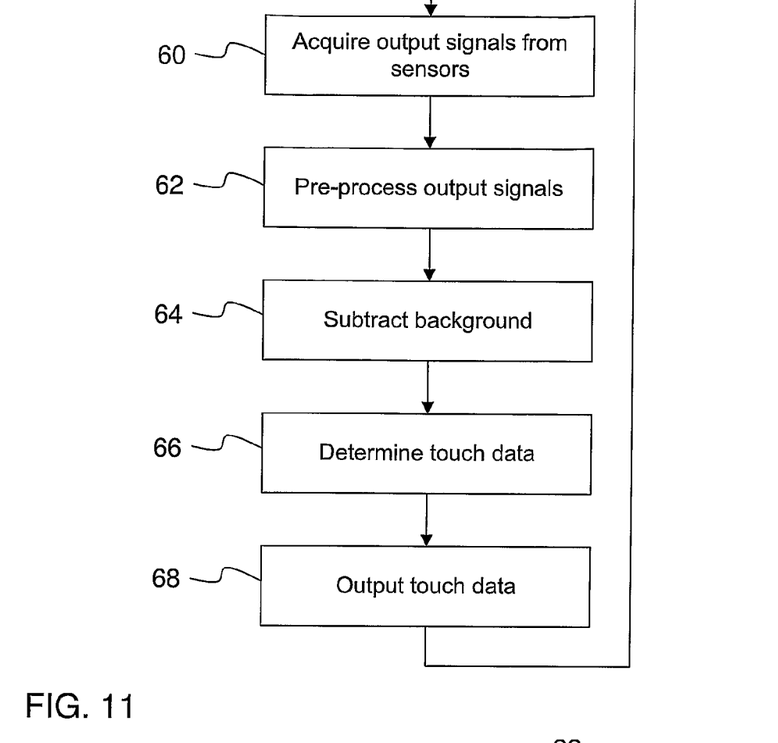
FIG. 11 is a flow chart of an exemplifying method for determining touch locations in a touch-sensing display apparatus.

The skilled person will readily realize that there are numerous methods for determining the touch locations. FIG. 11 is a flow chart of one such exemplifying method executed in the processing arrangement.

In a first step 60, output signals are acquired from the sensors in the display apparatus. These output signals represent the distribution of radiation (optionally within a limited spectral passband) that is received by the display area during a sensing instance.

Then, in step 62, the output signals are pre-processed. For example, the output signals may be processed for noise reduction using standard filtering techniques, e.g. low-pass filtering, median filters, Fourier-plane filters, etc. Furthermore, this step may involve removing/suppressing ambient light using electronic filtering, unless the filtering is done by processing hardware associated with the respective sensor, as described above in relation to the first inventive aspect. It is also to be understood that step 62 may be omitted, e.g. if ambient light is removed/suppressed by spectral filters.

Figure 12:
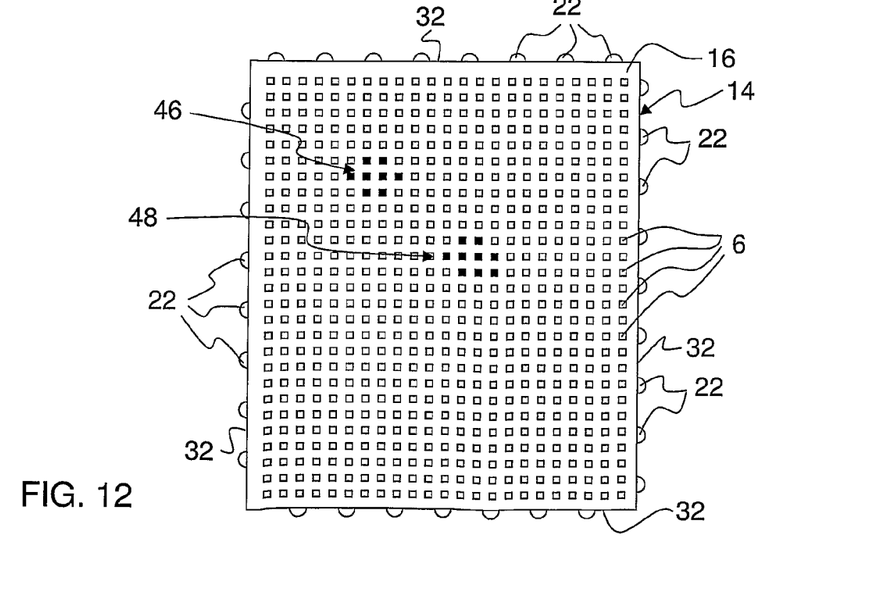
FIG. 12 illustrates processed image data overlaid on the light sensors of the display apparatus in FIG. 1A.

In step 64, background data is subtracted from the pre-processed output signals. The background data is suitably two-dimensional, i.e. specific to each sensor, and may be time-invariant, e.g. sampled in a preceding calibration phase. Alternatively, the background data may be continually updated, by intermittently repeating the calibration phase, to reduce the effect of remaining fingerprints and other contaminants on the touch surface. FIG. 12 illustrates pre-processed and background-corrected image data overlaid on the display apparatus of FIG. 1A, where two touching objects are represented by signals in two coherent groups 46, 48 of sensors 6.

In step 66, the touch locations are determined, based on the image data obtained from the output signals. In a first sub-step, a clustering algorithm (blob detection) is applied to the image data to cluster the sensors that detect the same touching object. The first sub-step may be based on any known blob detection algorithm, such as differential methods based on derivative expressions and methods based on local maxima in the image data. One widely used algorithm is the Laplacian of Gaussian (LoG). The first sub-step results in a set of potential regions caused by touching objects. In a second sub-step, the touch location is computed as the "centre of mass" of the sensors in each potential region using the strength of their detected signals:

$$\overline{p} = \frac{\sum I_b \cdot \overline{p}_b}{\sum I_b}$$

where $I_b$ is the strength of the scattering signal for a given sensor, and $\overline{p}_b$ is the position of the given sensor. The sums are evaluated for all sensors that have been clustered into a specific region/blob. The result, $\overline{p}$, is thus the touch location.

In a variant, the image data is processed for determination of other touch data than the location of each touching object. For example, methods well-known to the person skilled in the art may be operated on the image data in step 66 to generate a measure for each touching object of its contact area, shape, scattered light intensity etc.

After step 68, the determined touch data is output, and the process returns to step 60 for processing of a forthcoming sensing instance.

The invention has mainly been described above with reference to a few embodiments. However, as is readily appreciated by a person skilled in the art, other embodiments than the ones disclosed above are equally possible within the scope of the invention. The different features of the invention could be combined in other combinations than those described. The scope of the invention is defined and limited only by the appended patent claims.

For example, the sensors may be optimized to detect light in a specific wavelength region, suitably corresponding to the wavelengths of the illuminating radiation in the panel.

Further, the spatial resolution of the touch-sensing system is limited by the density of sensors, i.e. the number of sensors per unit area in the display area. Thus, any desired resolution can be achieved, provided that a sufficient number of sensors are used and that sufficient amount of radiation is introduced into the panel. Furthermore, the spatial resolution can be varied during operation of the touch-sensing display apparatus by inactivating a number of sensors, and different spatial resolution can be achieved in different parts of the display area.

The front panel 14 need not be a separate component attached to the front end of a display device, such as an LCD, a plasma display or OLED display. Instead, the front panel may be formed by an integral part of such a display device, e.g. a protective glass plate or a front layer that is essentially transmissive to the illuminating radiation and allows the illuminating radiation to propagate by internal reflection. It is even conceivable that the illuminating radiation is allowed to propagate throughout the entire display device. In such an embodiment, it may be preferable to arrange the array of sensors behind the display device, in accordance with the third inventive aspect. To avoid detection of propagating TIR radiation that has not yet been scattered by a touching object, the sensors may be arranged with an air gap to the rear of the display device. Such an air gap would form a TIR surface which prevents the light propagating in the display device from reaching the sensors, while allowing the light that is scattered by a touching object to reach the sensors. In a variant, such a TIR surface may be formed by a suitable combination of solid materials/layers in front of the sensors.

In all of the above-described embodiments and inventive aspects, light may be injected into the panel through the touch surface 16 and/or the opposite surface 18 instead of (or as a supplement to) being injected through a panel edge 32. For example, a wedge (e.g. similar to wedge 42 in FIG. 10) may be arranged in contact with the surface 16, 18 to couple a beam of light into the panel 14.

The invention claimed is:

1. An integrated touch-sensing display apparatus, comprising:
   an array of picture elements that defines a display area;
   an array of light-sensing elements integrated within the display area;
   a light guide located in front of the display area to define a touch surface, the light guide being configured to allow light to propagate inside the light guide by total internal reflection;
   a light source arrangement for providing illuminating light inside the light guide, such that an object contacting the touch surface causes frustration of the total internal reflection of the illuminating light and thereby a part of the illuminating light to be scattered towards the display area; and
   a processing element configured to obtain image data representing the scattered illuminating light impinging on the display area based on output signals from the light-sensing elements and independent of signal patterns resulting from ambient light, the processing element being further configured to determine the location of the object on the touch surface based on the image data; wherein at least a subset of the light-sensing elements are provided with respective lens devices, each lens device being configured to reduce a field of view of a corresponding light-sensing element, each lens device is configured to focus scattered illumination light from a portion of the touch surface onto the corresponding light-sensing element, and each lens device is configured such that light scattered by the object contacting the touch surface is projected onto a smaller area than light scattered by an object hovering above the touch surface.

2. The integrated touch-sensing display apparatus of claim 1, further comprising a filter arrangement for suppressing said ambient light.

3. The integrated touch-sensing display apparatus of claim 2, wherein the light source arrangement is configured to modulate the illuminating light at a predetermined modulation frequency, and wherein the filter arrangement comprises a circuit for lock-in detection at the modulation frequency, which circuit operates on the output signals from the light-sensing elements.

4. The integrated touch-sensing display apparatus of claim 2, wherein the light source arrangement is configured to modulate the illuminating light at a predetermined modulation frequency, and wherein the filter arrangement comprises at least one bandpass filter operating on the output signals from the light-sensing elements to remove frequencies outside a passband around the modulation frequency.

5. The integrated touch-sensing display apparatus of claim 4, wherein the at least one bandpass filter comprises an analog filter circuit.

6. The integrated touch-sensing display apparatus of claim 4, wherein the array of light-sensing elements and the at least one bandpass filter are integrated on a common substrate.

7. The integrated touch-sensing display apparatus of claim 3, wherein the modulation frequency is at least about 0.5 kHz.

8. The integrated touch-sensing display apparatus of claim 2, wherein the light source arrangement is configured to provide the illuminating light in a confined wavelength region, and wherein the filter arrangement comprises at least one spectral passband filter which is arranged in front of the light-sensing elements so as to suppress the ambient light in relation to the illuminating light.

9. The integrated touch-sensing display apparatus of claim 1, wherein the illuminating light is invisible to the human eye.

10. The integrated touch-sensing display apparatus of claim 9, wherein the illuminating light is in a wavelength region above 700 nm.

11. The integrated touch-sensing display apparatus of claim 1, wherein the lens device defines the field of view of the light-sensing element.

12. The integrated touch-sensing display apparatus of claim 11, wherein the lens device is arranged to focus an area of the touch surface onto the light-sensing element.

13. The integrated touch-sensing display apparatus of claim 1, wherein the light guide is made of solid material that defines the touch surface, a parallel opposite surface, and a peripheral edge surface which is orthogonal to the touch surface and connects the touch surface to the opposite surface, wherein the combination of light source arrangement and light guide is arranged to propagate the illuminating light by total internal reflection between the touch surface and the opposite surface such that the propagating light is internally reflected at least once against the peripheral edge surface.

14. The integrated touch-sensing display apparatus of claim 13, wherein the light source arrangement is arranged to inject at least one beam of light into the light guide such that the beam, in a plane parallel to the touch surface, hits the peripheral edge surface at an angle $\alpha$ to the normal of the peripheral edge surface: $0<\alpha<90°$.

15. The integrated touch-sensing display apparatus of claim 14, wherein the angle is selected to cause multiple reflections of the beam against the peripheral edge surface.

16. The integrated touch-sensing display apparatus of claim 13, wherein the peripheral edge surface is at least partly provided with a reflective material.

17. The integrated touch-sensing display apparatus of claim 16, wherein the light source arrangement is configured to inject the beam through an injection port comprising an opening in the reflective material.

18. The integrated touch-sensing display apparatus of claim 17, further comprising a light transmissive index-matched wedge which is arranged on said opening such that a beam-receiving surface of the wedge is orthogonal to a main direction of the beam.

19. The integrated touch-sensing display apparatus of claim 17, comprising a set of injection ports, each comprising an opening in the reflective material, the total surface area of the openings being less than 10% of the total surface area of the peripheral edge surface.

20. The integrated touch-sensing display apparatus of claim 1, further comprising an angle-control element intermediate the light source arrangement and the light guide, said angle-control element being configured to prevent the illuminating light from propagating through the light guide without being reflected in the touch surface.

21. The integrated touch-sensing display apparatus of claim 20, wherein the angle-control element is configured to receive at least part of light emitted by the light source and redirect the thus-received light for reflection in the touch surface.

22. The integrated touch-sensing display apparatus of claim 1, wherein the array of light-sensing elements is located behind the array of picture elements, as seen from the touch surface.

23. The integrated touch-sensing display apparatus of claim 22, wherein each light-sensing element is arranged to at least partially overlap a respective picture element.

24. The integrated touch-sensing display apparatus of claim 1, wherein the processing element is configured to determine the location of the object by identifying a high-intensity region in the image data.

25. A method of operating an integrated touch-sensing display apparatus, which apparatus includes, an array of picture elements that defines a display area, an array of light-sensing elements integrated to sense light within the display area, a light guide located in front of the display area to define a touch surface, the light guide being configured to allow light to propagate inside the light guide by total internal reflection, and a light source arrangement, said method comprising:

controlling said at least one light source arrangement to provide illuminating light inside the light guide, such that an object contacting the touch surface causes frustration of the total internal reflection of the illuminating light and thereby a part of the illuminating light to be scattered towards the display area; and obtaining image data representing the scattered illuminating light that impinges on the display area based on output signals from the light-sensing elements and independent of signal patterns resulting from ambient light, and determining the location of the object on the touch surface based on the image data; wherein at least a subset of the light-sensing elements are provided with respective lens devices, each lens device being configured to reduce a field of view of a corresponding light-sensing element, each lens device is configured to focus scattered illumination light from a portion of the touch surface onto the corresponding light-sensing element, and each lens device is configured such that light scattered by the object contacting the touch surface is projected onto a smaller area than light scattered by an object hovering above the touch surface.

26. The method of claim 25, further comprising controlling the light source arrangement to modulate the illuminating light at a predetermined modulation frequency, and operating a circuit for lock-in detection at the modulation frequency on the output signals from the light-sensing elements.

27. The method of claim 25, further comprising controlling the light source arrangement to modulate the illuminating light at a predetermined modulation frequency, and obtaining the image data from at least one bandpass filter which operates on the output signals from the light-sensing elements to remove frequencies outside a passband around the modulation frequency.

28. The method of claim 25, further comprising operating the light source arrangement to provide the illuminating light in a confined wavelength region, wherein at least one wavelength filter is arranged in front of the light-sensing elements so as to suppress the ambient light in relation to the illuminating light.

29. The method of claim 28, wherein the illuminating light is in a wavelength region above 700 nm.

30. The method of claim 25, wherein the light guide is made of solid material that defines the touch surface, a parallel opposite surface, and a peripheral edge surface which is orthogonal to the touch surface and connects the touch surface to the opposite surface, said method further comprising operating the light source arrangement to propagate the illuminating light by total internal reflection between the touch surface and the opposite surface such that the propagating light is internally reflected at least once against the peripheral edge surface.

31. The method of claim 30, wherein the light source arrangement is operated to cause multiple reflections of the beam against the peripheral edge surface.

32. The method of claim 25, wherein determining the location comprises identifying a high-intensity region in the image data.

33. A non-transitory computer-readable medium comprising program instructions which, when executed by a processor, cause the processor to perform the method of claim 25.

34. An integrated touch-sensing display apparatus, comprising:

an array of picture elements that defines a display area;

an array of light-sensing elements integrated within the display area;

a light guide located in front of the display area to define a touch surface, the light guide being configured to allow light to propagate inside the light guide by total internal reflection;

a plurality of lens devices, each of the plurality of lens devices being between the light guide and a corresponding light sensing element, and each of the plurality of lens devices being configured to reduce a field of view of the corresponding light-sensing element;

a light source arrangement for providing illuminating light inside the light guide, such that an object contacting the touch surface causes frustration of the total internal reflection of the illuminating light and thereby a part of the illuminating light to be scattered towards the display area; and a processing element configured to obtain, based on output signals from the light-sensing elements, image data that represents the scattered illuminating light that impinges on the display area excluding ambient light, and to determine, based on the image data, the location of the object on the touch surface; wherein each lens device is configured to focus scattered illumination light from a portion of the touch surface onto the corresponding light-sensing element, and each lens device is configured such that light scattered by the object contacting the touch surface is projected onto a smaller area than light scattered by an object hovering above the touch surface.

35. The display apparatus of claim 1, wherein the light-sensing elements are interleaved with the picture elements.

36. The method of claim 25, wherein the light-sensing elements are interleaved with the picture elements.

37. The display apparatus of claim 34, wherein the light-sensing elements are interleaved with the picture elements.

38. The integrated touch-sensing display apparatus of claim 1, wherein each lens device is configured to focus the scattered illumination light from the portion of the touch surface onto the corresponding light-sensing element, such that detection of the illumination light scattered by the object contacting the touch surface is enhanced over detection of the light reflected by the object hovering above the touch surface.

39. The integrated touch-sensing display apparatus of claim 1, wherein each lens device is configured to focus the field of view of the corresponding light sensing element onto the touch surface.

* * * * *